United States Patent
Miyajima et al.

(10) Patent No.: US 7,885,252 B2
(45) Date of Patent: Feb. 8, 2011

(54) IP TELEPHONE APPARATUS

(75) Inventors: Akira Miyajima, Yokohama (JP); Kazuto Kobayashi, Kawasaki (JP)

(73) Assignee: Panasonic Corporation, Osaka (JP)

( * ) Notice: Subject to any disclaimer, the term of this patent is extended or adjusted under 35 U.S.C. 154(b) by 1192 days.

(21) Appl. No.: 11/235,273

(22) Filed: Sep. 27, 2005

(65) Prior Publication Data

US 2006/0083222 A1    Apr. 20, 2006

(30) Foreign Application Priority Data

Oct. 5, 2004    (JP)    ............... 2004-292864

(51) Int. Cl.
H04L 12/66    (2006.01)
H04M 3/42    (2006.01)
G06F 15/16    (2006.01)

(52) U.S. Cl. ............... 370/352; 370/401; 379/220.01; 709/245

(58) Field of Classification Search ............ 370/395.54, 370/466, 467, 351, 352–357, 389, 401
See application file for complete search history.

(56) References Cited

U.S. PATENT DOCUMENTS

| | | | |
|---|---|---|---|
| 3,885,871 A * | 5/1975 | Galatha et al. ............... 355/23 |
| 6,157,636 A * | 12/2000 | Voit et al. ............... 370/353 |
| 6,373,817 B1 * | 4/2002 | Kung et al. ............... 370/217 |
| 6,498,797 B1 | 12/2002 | Anerousis et al. |
| 6,594,254 B1 * | 7/2003 | Kelly ............... 370/352 |
| 6,678,265 B1 * | 1/2004 | Kung et al. ............... 370/352 |
| 6,917,612 B2 * | 7/2005 | Foti et al. ............... 370/352 |
| 7,106,473 B2 * | 9/2006 | Sekiguchi ............... 358/1.15 |
| 7,280,239 B2 * | 10/2007 | Sekiguchi ............... 358/1.15 |
| 7,480,287 B2 * | 1/2009 | Tanimoto ............... 370/352 |
| 7,508,819 B2 * | 3/2009 | Kobayashi et al. ............... 370/352 |
| 2001/0055299 A1 * | 12/2001 | Kelly ............... 370/352 |
| 2003/0103492 A1 | 6/2003 | Tanimoto |
| 2003/0214940 A1 | 11/2003 | Takken |
| 2005/0182781 A1 * | 8/2005 | Bouvet ............... 707/102 |
| 2006/0003770 A1 * | 1/2006 | Park ............... 455/445 |

(Continued)

FOREIGN PATENT DOCUMENTS

EP    1061728    12/2000

(Continued)

OTHER PUBLICATIONS

Network Working Group, M. Mealling R. Daniel, Request for Comments, Updates, Sep. 2000.*

(Continued)

*Primary Examiner*—Nathan Flynn
*Assistant Examiner*—Wutchung Chu
(74) *Attorney, Agent, or Firm*—Greenblum & Bernstein, P.L.C.

(57) ABSTRACT

A source IP telephone inputs, from its numeric keypad, a telephone number of a call destination and obtains, from an ENUM server, a NAPTR record of the destination IP telephone based upon the input telephone number of the call destination. By referring to a search table, the source IP telephone retrieves, from the obtained NAPTR record, an available specific number in the ascending order of call rates from the lowest based upon communication services available to the source IP telephone. The source IP telephone transmits a call to the destination IP telephone by using the retrieved specific number.

6 Claims, 7 Drawing Sheets

U.S. PATENT DOCUMENTS

2007/0036127 A1* 2/2007 Roosen et al. .............. 370/352

FOREIGN PATENT DOCUMENTS

| JP | 8-130594 | 5/1996 |
| JP | 2003-169103 | 6/2003 |
| JP | 2004-248086 | 9/2004 |

OTHER PUBLICATIONS

English Language Abstract of JP 2004-248086.
English Language Abstract of JP 8-130594.
ENUM Trial Japan, "ENUM Trial Japan First Report," May 2004, together with an English language translation of the same.
Sinnreich et al., "Mastering TCP/IP SIP, Chapter 14 (DVS and ENUM)" together with an English language translation of the same.
U.S. Appl. No. 11/150,119 to Kobayashi et al., filed Jun. 13, 2005.
U.S. Appl. No. 11/235,154 to Miyajima, filed Sep. 27, 2005.
U.S. Appl. No. 11/235,217 to Miyajima et al., filed Sep. 27, 2005.
U.S. Appl. No. 11/235,275 to Miyajima, filed Sep. 27, 2005.
U.S. Appl. No. 11/235,156 to Miyajima et al., filed Sep. 27, 2005.
U.S. Appl. No. 11/249,715 to Kobayashi et al., filed Oct. 14, 2005.
English Language Abstract of RP 1 061 728.
Faltstrom, "E. 164 number and DNS," IETF Standard, Internet Engineering Task Force, IETF, CH, (Sep. 2000), XP015008699.
Conroy et al. JPRSL, "ENUM Implementation Issues and Experiences," IETF Standard-Working-Draft, Internet Engineering Task Force, IETF, CH, vol. enum, (Jul. 2004), XP015018179.
Stastny, "Scenarios for ENUM and ENUM-like Systems <draft-stantny-enum-scenarios-00.txt>," IETF Standard-working-draft, Internet Engineering Task Force, IETF, CH, pp. 1-18, (Jun. 2002), XP015005364.
"Report of the Department of State ITAC-T Advisory Committee Study Group A Ad Hoc on ENUM," chaired by G. Richenaker, ENUM, pp. 1-39, (Jun. 6, 2001), XP002238095.
Kaspch Carriercom AG: "ENUM Trial," online (Dec. 28, 2003), XP002363054, Retrieved from the Internet<URL: http://web.archive.org/web/20031228201931/http://www.kapsch.net/CarrierCom/de/4627_DEU_HT MLExtranetCD.html > on Jan. 10, 2005, in English and German.
Yoshirou Yoneya, Nikkei Byte Saishin Network Gijyutu Taikei, Feb. 22, 2004, No. 47, pp. 116-120, together with an English language translation.

* cited by examiner

Fig.5

| ENUM domain name | | Order | Preference | Flags | Service | | URI scheme | |
|---|---|---|---|---|---|---|---|---|
| | | | | | | | | URI |
| 0.0.0.0.0.0.1.3.1.8.e164.arpa | IN NAPTR | 100 | 10 | "u" | "E2U+sip" | "!^.*$!sip:" | 81310000000@tokyo.sip.jp" | |
| | IN NAPTR | 100 | 10 | "u" | "E2U+http" | "!^.*$!http:" | //www.tokyo.sip.com/user81310000000.html" | |
| 1.0.0.0.0.0.1.3.1.8.e164.arpa | IN NAPTR | 100 | 10 | "u" | "E2U+sip" | "!^.*$!sip:" | 81310000001@tokyo.mail.com" | |
| | IN NAPTR | 100 | 10 | "u" | "E2U+http" | "!^.*$!http:" | //www.tokyo.sip.com/user81310000001.html" | |

NAPTR resource record

Fig.7

```
$ORIGIN x.x.x.5.4.4.5.5.4.1.8.e164.arpa
IN NAPTR 100 10 " u " " E2U+sip    "     " !^.*$!sip:info@sip.aaaa.com!"
IN NAPTR 104 10 " u " " E2U+talk:tel "    " !^.*$!tel:+81455445xxx!"
IN NAPTR 102 10 " u " " E2U+message:mailto " " !^.*$!mailto:miyajima.bbbb@jp.aaaa.com!"
IN NAPTR 106 10 " u " " E2U+ifax   "     " !^.*$!mailto:ifax@jp.aaaa.com!"
```

IP TELEPHONE APPARATUS

BACKGROUND OF THE INVENTION

1. Field of the Invention

The present invention relates to an IP telephone apparatus that can be applied to an IP telephone system utilizing ENUM (tElephone NUmber Mapping) technology.

2. Description of Related Art

Recently, telecommunications providers have built VoIP (Voice over Internet Protocol) network on the Internet and provided services that connect IP telephone apparatuses owned by subscribers on these VoIP networks. In addition, low-cost communication services have been provided wherein PSTN (Public Switched Telephone Network) and VoIP networks that are provided by telecommunications providers are connected, thereby establishing a connection via such a VoIP network when a call is placed from an IP telephone apparatus to an ordinary telephone apparatus at a remote place. Furthermore, besides services provided by telecommunications providers via VoIP networks using a 050 number system, multimedia communication services including voice communication have been provided by service providers by building their own independent communication networks. When subscribing to these service providers in order to get such communication services, specific numbers (not limited to numerals) that specify subscribers on their independent communication networks are assigned, as is the case with regular telephone numbers.

As described above, current IP telephone apparatuses may be configured to have regular telephone numbers that are used when using PSTN services, 050 telephone numbers that are used when using IP telephone services provided by telecommunications providers on the Internet (VoIP network), and specific numbers that are used when using voice communication services provided by service providers on the Internet based on non-050 number systems (independent communication network).

Users are able to select and dial, using a specific number that enables the lowest call rate, by identifying in advance service types that the call destination is able to use and specific numbers needed to receive those individual communication services.

In addition, telephone apparatuses equipped with an LCR (Lowest Cost Routing) function are also known (Refer to Related Art 1, for example). Such telephone apparatuses with the LCR function write in, in a selection table therein, information needed to select, from the telephone numbers of the call destination, the lowest cost telephone line at the time of call and selects the lowest cost telephone line by referring to the selection table based upon the specified telephone number.

[Related Art 1] Japanese Patent Laid-Open Publication 8-130594

As described above, when one IP telephone apparatus has a plurality of specific numbers, the lowest-cost communication service combination is determined by a particular combination of communication services available to the caller and communication services available to the call destination. However, it is difficult for the caller to not only memorize communication services available to the source IP telephone apparatus but also identify communication services available to the destination IP telephone apparatus in order to establish a connection with the destination IP telephone apparatus in the most economical way. In addition, telephone apparatuses with the LCR function are not configured to select the lowest-cost line by identifying communication services available to both caller and call destination.

SUMMARY OF THE INVENTION

The present invention is provided to address the above-described problems. The purpose of the present invention is to provide an IP telephone apparatus that is capable, when placing a call, of selecting a specific number of a call destination, the specific number that enables the lowest-cost service upon determining communication services that are available to the caller and the call destination.

The present invention relates to an IP telephone apparatus that includes a dialing unit, a data obtainer, a retrieval unit and a transmitter. The dialing unit is used to input a telephone number of a call destination. The data obtainer is used to obtain, from an ENUM server, a NAPTR record for a call destination based upon the input telephone number of the call destination. The retrieval unit is used to retrieve, from the NAPTR record, an available specific number in the ascending order of call rates from the lowest based upon communication services available to the caller. The transmitter is used to transmit a call to the call destination with the retrieved specific number.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 illustrates an example of a set of NAPTR records that are stored in a DB of the ENUM server according to the embodiment;

FIG. 7 illustrates an example of a NAPTR record for a destination IP telephone apparatus according to the embodiment.

DETAILED DESCRIPTION OF PREFERRED EMBODIMENTS

The embodiments of the present invention are explained in the following, in reference to the above-described drawings.

Figure 1:
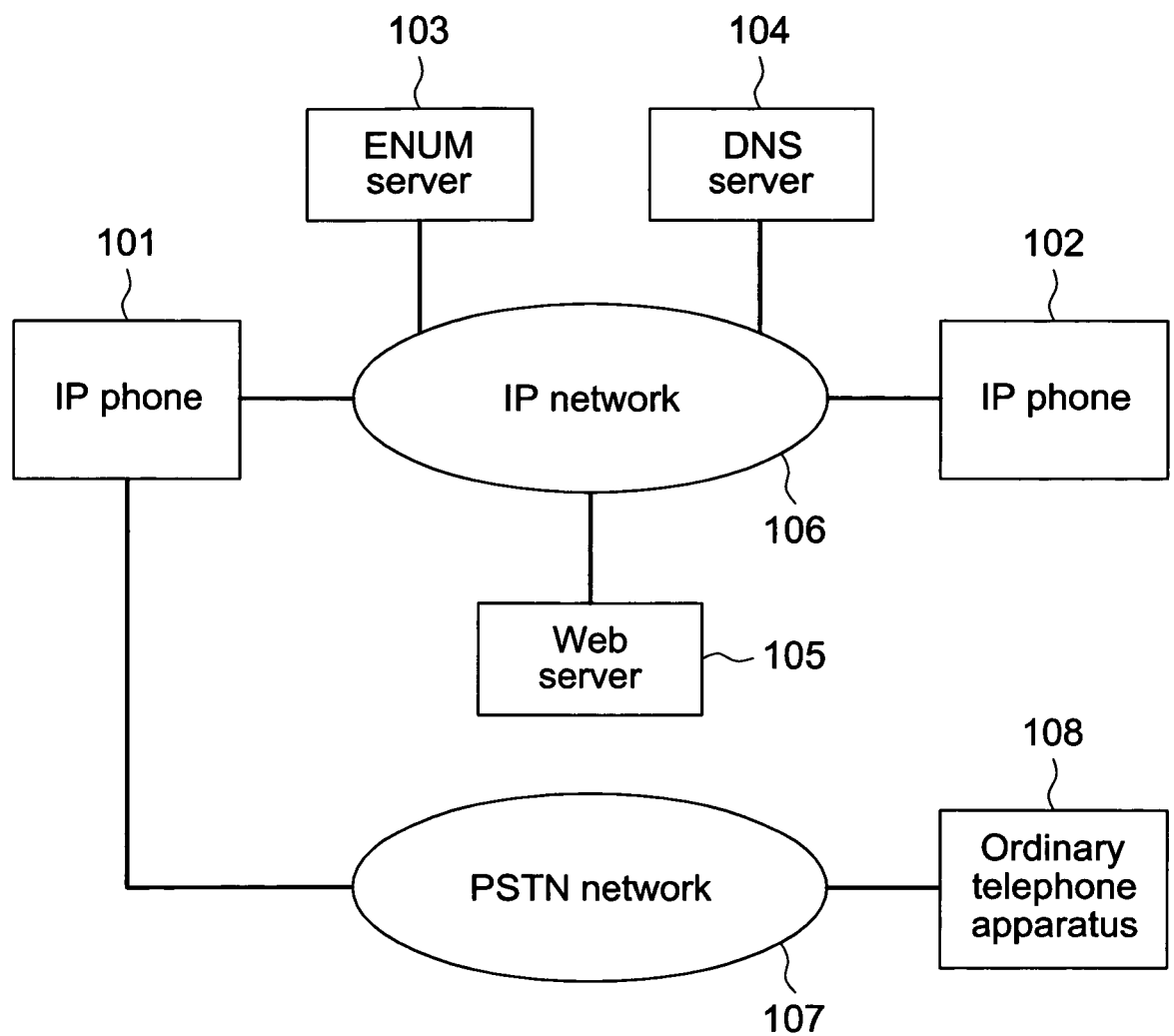
FIG. 1 illustrates a network configuration to which an IP telephone system according to an embodiment of the present invention is applied.

FIG. 1 illustrates a network configuration to which an IP telephone system according to an embodiment of the present invention is applied.

As shown in FIG. 1, a plurality of IP telephone apparatuses (hereafter referred to as "IP phone") 101, 102, ENUM server 103, DNS server 104 and Web server 105 as a database server are connected via IP network 106. IP phones 101 and 102 are examples of IP terminals that enable voice communication via IP network 106. IP phone 101 is configured to enable voice communication with ordinary telephone apparatus 108 by connecting to PSTN 107.

IP phone 101 (102) has a function that enables voice communication via IP network 106 after establishing a connection or a session with another IP telephone apparatus based upon call control protocols such as H.323, H.248 or SIP (Session Initiation Protocol). IP phone 101 (102) also has a browsing function that allows users to access Web server 105 according to an http protocol and to read HTML texts provided by Web server 105.

ENUM server 103 is equipped with a database (DB) that stores a NAPTR resource record (hereafter referred to as "NAPTR record"), which is described later. The DB of ENUM server 103 stores one URI or a plurality of URIs for each domain name in the form of a NAPTR record, so that an IP terminal corresponding to such URIs can be identified on IP network 106. ENUM server 103 transmits, to IP phone 101 (102), the NAPTR record stored in the DB in response to a query (hereafter referred to as "ENUM query") from IP phone 101 (102).

DNS server 104 is equipped with a DB that stores URIs specified in a NAPTR record and IP addresses corresponding to the URIs. DNS server 104 retrieves, from the DB, an IP address corresponding to a URI and transmits, to IP phone 101 (102), the IP address in response to a query from IP phone 101 (102).

Web server 105 is equipped with a DB that stores information (hereafter referred to as "caller information"), the information being for identifying a caller of IP phone 101 (102) that is connected to IP network 106. Caller information includes the caller's telephone number (hereafter referred to as "caller number"), name, address, email address and image data such as a photo of the caller's face. Caller information is not limited to individual information and may include a company's name, telephone number, address, email address and advertisement. Web server 105 transmits, to IP phone 101 (102), caller information stored in the DB in response to a request from IP phone 101 (102) that has received a call.

Figure 2:
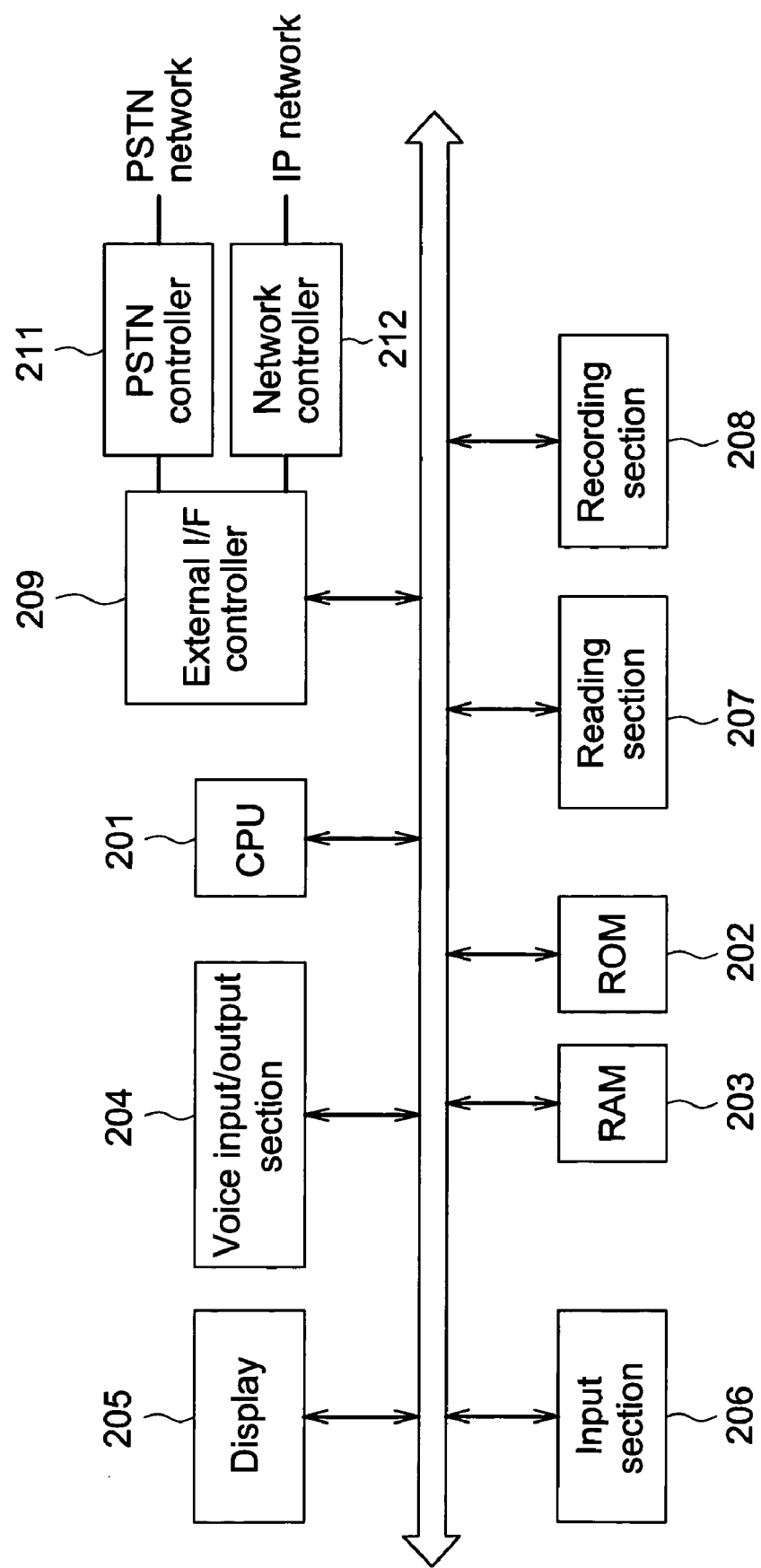
FIG. 2 is a block diagram illustrating a configuration of an IP telephone apparatus that constitutes the IP telephone system according to the embodiment.

FIG. 2 is a block diagram illustrating a configuration of IP phone 101 according to the present embodiment. IP phone 102 has the same configuration as IP phone 101.

IP phone 101 may perform various installed functions such as IP telephone, facsimile and e-mail when CPU 201 reads and executes a program stored in ROM 202. ROM 202 stores an application program that provides functions such as IP telephone, facsimile and e-mail. RAM 203 serves as a work area for CPU 201.

IP phone 101 includes voice input/output section 204, display 205 and input section 206. Voice input/output section 204 is equipped with a microphone and a speaker for voice communication. Display 205 displays various information including caller and destination telephone numbers. Input section 206 includes numeric keypad, button, softswitch and the like. IP phone 101 further includes reading section 207 and recording section 208. Reading section 207 is used to scan documents to be faxed. Recording section 208 is used to print received data.

IP phone 101 is configured to be able to connect to PSTN 107 and IP network 106 via external I/F controller 209. External I/F controller 209 switches a connection to PSTN controller 211 or to network controller 212 under the control of CPU 201.

CPU 201 controls transmission of a query (hereafter referred to as "ENUM query") that inquires ENUM server 103 of a NAPTR record that corresponds to a destination terminal and reception of a response (hereafter referred to as "ENUM response") to the ENUM query. CPU 201 further controls transmission of a query (hereafter referred to as "IP address query") that inquires DNS server 104 of an IP address and reception of a response (hereafter referred to as "IP address response") to the IP address query. In this case, a connection is made to IP network 106 via network controller 212.

Display 205 includes, for example, an LCD (Liquid Crystal Display). Display 205 displays the current status of IP phone 101, input telephone numbers and other information. In addition, display 205 displays HTML texts downloaded from Web server 105.

Figure 3:
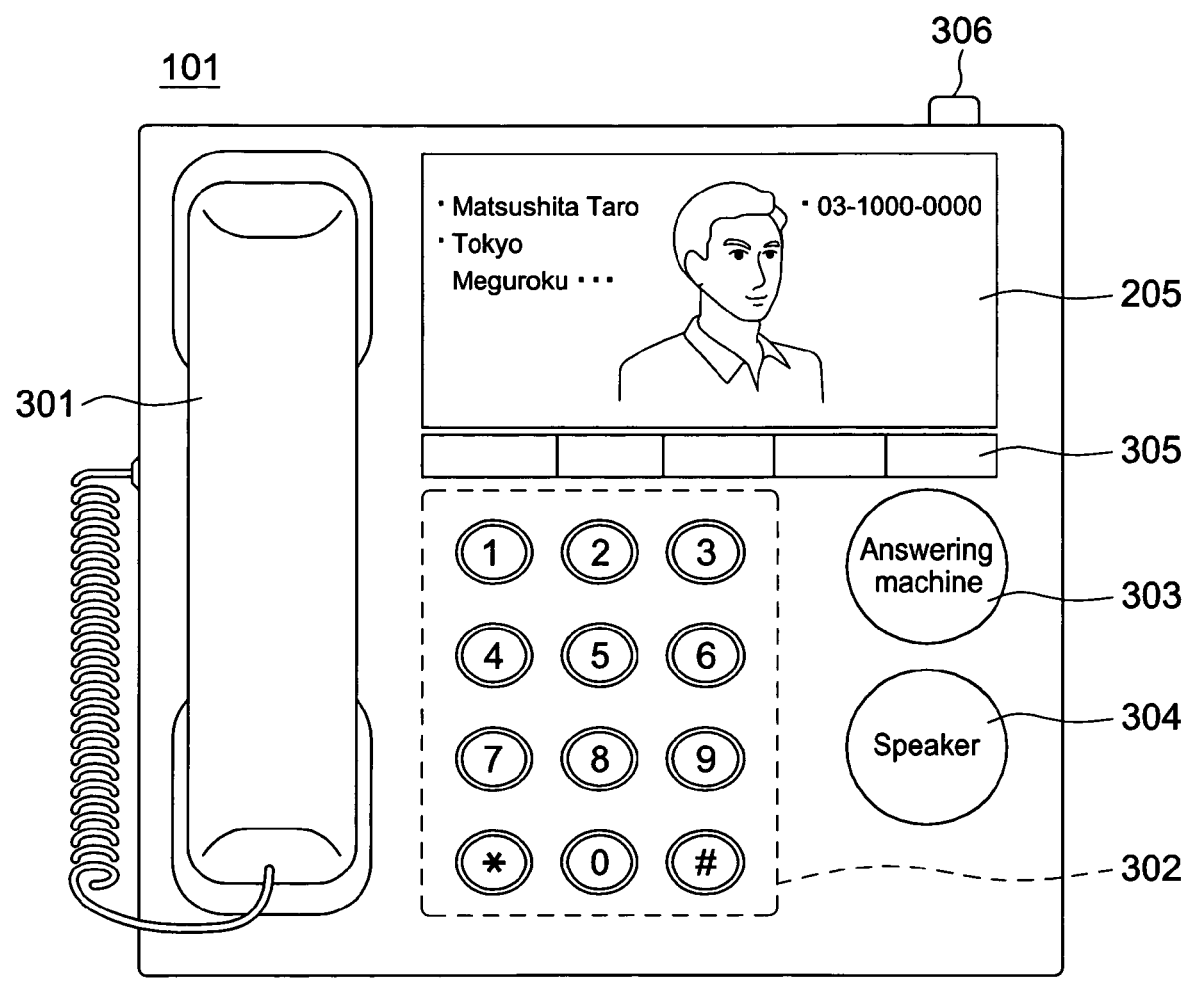
FIG. 3 illustrates a front view of an appearance of the IP telephone apparatus according to the embodiment.

FIG. 3 illustrates a front view of an appearance of IP phone 101 according to the present embodiment. IP phone 102 has the same configuration as IP phone 101.

As shown in FIG. 3, IP phone 101 includes receiver 301 that receives an operator's voice. IP phone 101 further includes numeric keypad 302 that is used to input telephone numbers and other information. To the right side of numeric keypad 302, AM (Answering Machine) key 303 and speaker key 304 are located. AM key 303 is used to switch to the answering machine mode. Speaker key 304 is used to change to an external voice output. Furthermore, IP phone 101 includes, above numeric keypad 302, function key 305 that can be used to set various functions such as a single touch transmission. IP phone 101 further includes, on its side, interface (LAN I/F) 306 with LAN that is connected to IP network 106.

Display 205 configured with an LCD or the like is located above function key 305. Display 205 displays, for example, caller information (e.g., caller numbers and names) downloaded from Web server 105.

Figure 4:
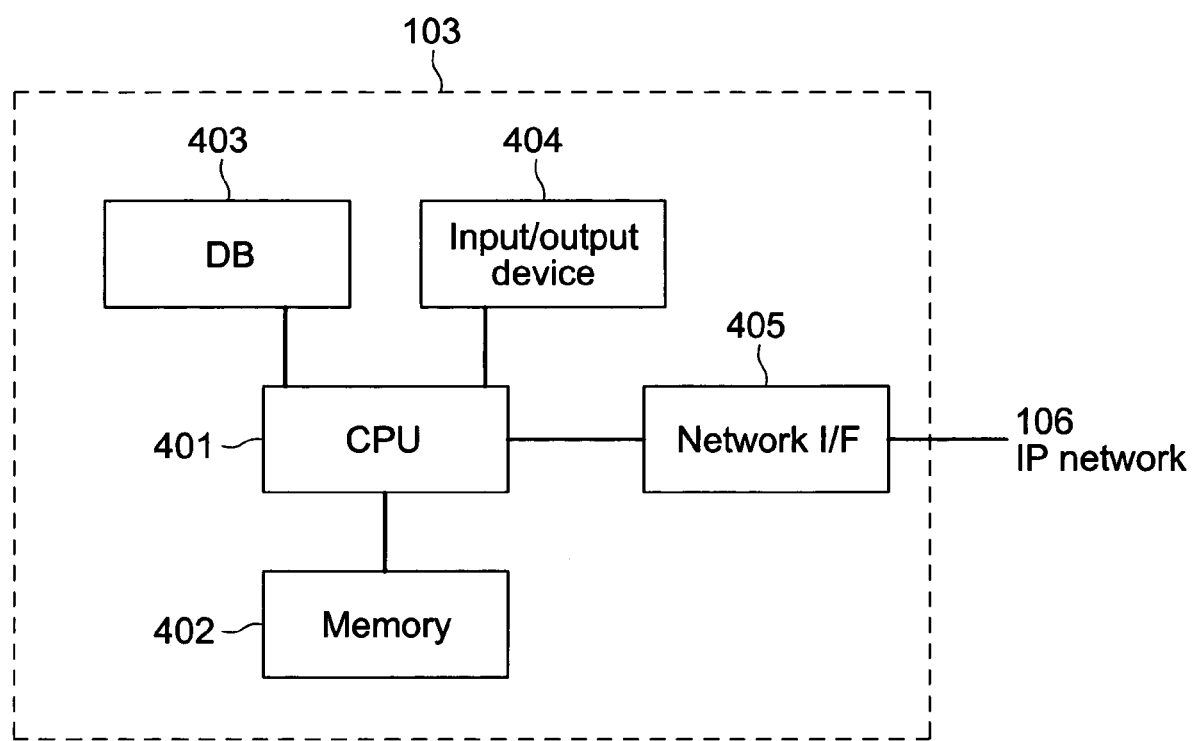
FIG. 4 is a block diagram illustrating a typical configuration of an ENUM server in the IP telephone system according to the embodiment.

FIG. 4 is a block diagram illustrating a typical configuration of ENUM server 103 in the IP telephone system according to the embodiment. DNS server 104 and Web server 105 have the same configuration as ENUM server 103 except that they have different data stored in their databases.

As shown in FIG. 4, ENUM server 103 is configured with CPU 401 that controls the entire operation of ENUM server 103. Memory 402 is connected to CPU 401. Memory 402 has ROM and RAM functions. The ROM stores a control program for ENUM server 103, the control program being read and executed by CPU 401. The RAM functions as a work memory when CPU 401 executes the control program.

Database (DB) 403 is connected to CPU 401. DB 403 stores a NAPTR record. Upon receiving an ENUM query from IP phone 101, for example, CPU 401 searches for a NAPTR record corresponding to the ENUM query among the data stored in DB 403. CPU 401 then transmits the corresponding NAPTR record to IP phone 101 that has transmitted the ENUM query.

Furthermore, input/output device 404 is connected to CPU 401. Input/output device 404 includes an input device such as a keyboard and an output device such as a display. The input device is used, for example, to add and edit the data stored in DB 403. The output device is used, for example, for administrators of ENUM server 103 to verify the data stored in DB 403.

Furthermore, network interface (I/F) 405 is connected to CPU 401. Network I/F 405 is an interface with IP network 106 to which ENUM server 103 is connected.

FIG. 5 illustrates an example of a set of NAPTR records stored in DB 403 of ENUM server 103 according to the present embodiment. FIG. 5 shows a case wherein NAPTR records are stored in association with the domain names obtained from telephone numbers "0310000000" and "0310000001".

In FIG. 5, URIs "81310000000@tokyo.sip.jp" and "//www.tokyo.sip.com/user81310000000.html" correspond to domain name "0.0.0.0.0.0.0.1.3.1.8.e164.arpa" obtained from telephone number "0310000000". The service field of the first URI specifies "E2U+sip", which indicates that the terminal specified by "0310000000" is able to perform under the SIP protocol. The service field of the second URI specifies "E2U+http", which indicates that the terminal specified by "0310000000" is able to perform under the http protocol.

Furthermore, URIs "81310000001@tokyo.mail.jp" and "//www.tokyo.sip.com/user81310000001.html" correspond to domain name "1.0.0.0.0.0.0.1.3.1.8.e164.arpa" obtained from telephone number "0310000001". The service field of the first URI specifies "E2U+sip", which indicates that the terminal specified by "0310000001" is able to perform under the SIP protocol. The service field of the second URI specifies "E2U+http", which indicates that the terminal specified by "0310000001" is able to perform under the http protocol.

Figure 6:
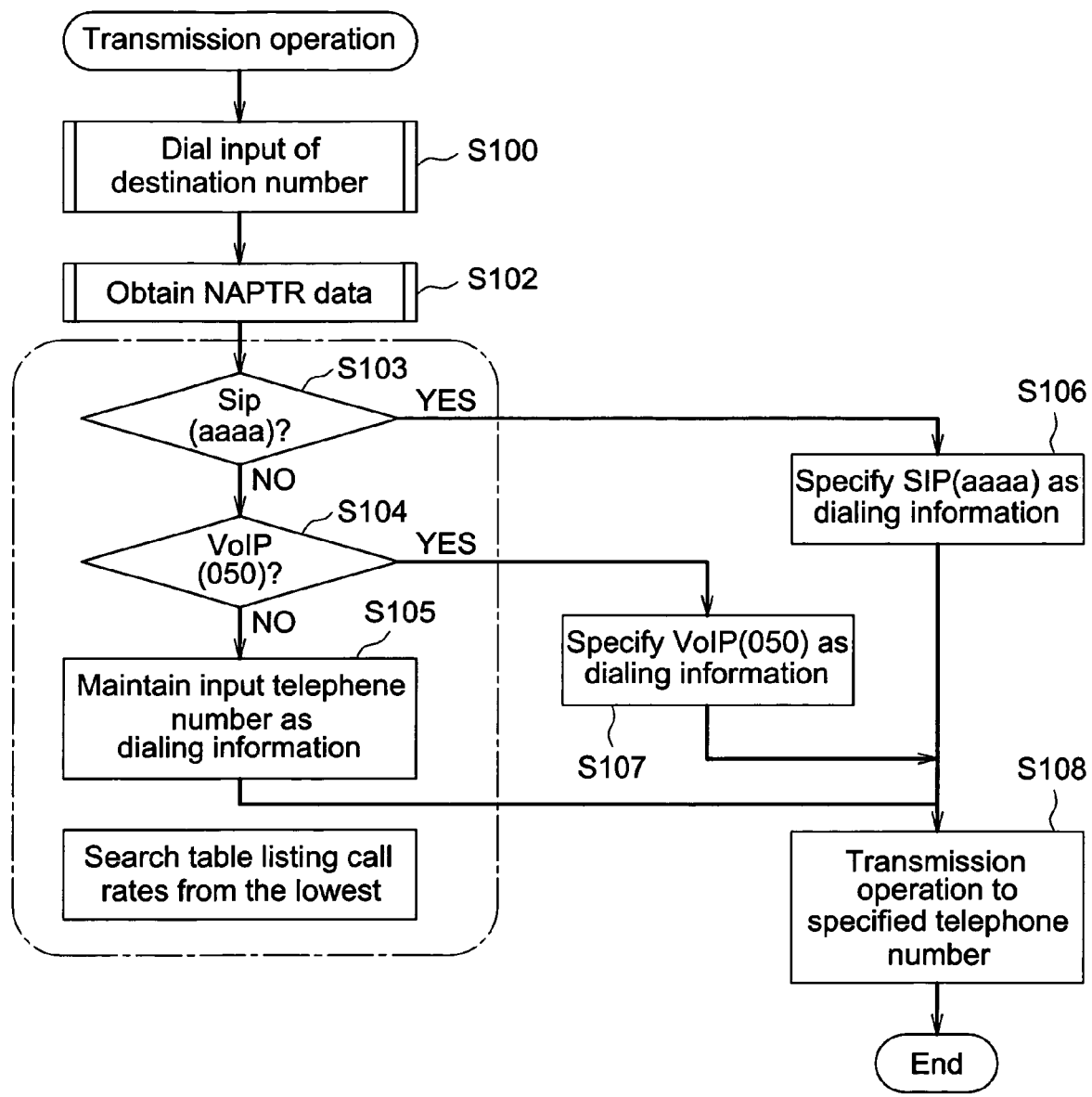
FIG. 6 is a flowchart illustrating an operation of the IP telephone apparatus according to the embodiment.

The following describes, with reference to the FIG. 6 flowchart, the operations until IP phone 101 starts voice communication with IP phone 102 in the IP telephone system according to the present embodiment.

It is assumed here that DB 403 of ENUM server 103 stores the NAPTR record shown in FIG. 7 as the NAPTR record of the destination IP phone 102.

When IP phone 101 performs voice communication with IP phone 102, an operator inputs a regular telephone number (PSTN) of IP phone 102. A NAPTR record acquisition process is executed (S102) after the IP phone 101 operator inputs the regular telephone number (PSTN) of IP phone 102 (S100). More specifically, an instruction for transmitting an ENUM query is made after telephone number "0455445XXX" is input.

After receiving the telephone number and then the ENUM query transmission instruction, IP phone 101 transmits, to ENUM server 103, an ENUM query for the NAPTR record that corresponds to this telephone number. In this case, IP phone 101 first converts the operator's input telephone number "0455445XXX" into the E.164 number "+81-4-55445XXX" including the country code. Then, "+81455445XXX" is obtained by maintaining + at the beginning and the numbers. Next, non numerical symbols are deleted, and dots are inserted between the numbers, resulting in "8.1.4.5.5.4.4.5.X.X.X". Then, the numbers are reversed, and data string ".e164.arpa" is added at the end. As a result, domain name "X.X.X.5.4.4.5.5.4.1.8.e164.arpa" is obtained, after which the ENUM query for the NAPTR record that corresponds to the domain name is transmitted.

Upon receiving the ENUM query, ENUM server 103 retrieves the NAPTR record that corresponds to domain name "X.X.X.5.4.4.5.5.4.1.8.e164.arpa" and sends, to IP 101, an ENUM response that includes the corresponding NAPTR record. By sending the ENUM response to IP phone 101, IP phone 101 acknowledges that the destination IP phone 102 is able to use a communication service via an independent communication network (SIP.aaaa.com), a communication service via a VoIP network using the 050 number system (VoIP.bbbb.com) and a communication service via a PSTN (81455445XXX) and to obtain specific numbers (sip:info@sip.aaaa.com, sip:05012345678@Voip.bbbb.com, tel: 045-544-5XXX) that are needed to use these communication services.

Upon obtaining the communication services available to the destination IP phone 102, IP phone 101 determines the lowest-cost communication service for voice communication with the destination IP phone 102 by using the search table that lists communication services available to IP phone 101 in the ascending order of service rates from the lowest. In this example, the source IP phone 101 stores three communication services as voice communication services: the communication service via the independent communication network (sip.aaaa.com), the communication service via the VoIP network using the 050 number system and the communication service via the PSTN.

IP phone 101 first checks whether the destination IP phone 102 is able to use the communication service via the independent communication network (sip.aaaa.com) (S103). It is assumed here that a specific service provider provides an IP telephone service free of charge within its independent communication network. In this case, when the call destination is subscribed to the same service provider as the caller and is able to use the independent communication network, it is possible to enjoy voice communication free of charge within the independent communication network.

In the present example, as shown in FIG. 7, the destination IP phone 102 stores, in its NAPTR record, the communication service (sip.aaaa.com) that uses the independent communication network. The source IP phone 101 uses the same independent communication network, thus resulting in "YES" in step S103 shown in FIG. 6. As a result, the process proceeds to step S106, specifying URI "sip:info@sip.aaaa.com" using the independent communication network as dialing information (S106). The source IP phone 101 then transmits a call to URI "sip:info@sip.aaaa.com" of the destination IP phone 102 as its call destination (S108).

When the NAPTR record of the destination IP phone 102 include no URI that uses the same independent communication network as the source IP phone 101, the process proceeds to step S104 where the source IP phone 101 determines whether the destination IP phone 102 stores a 050-prefixed IP phone number that the source IP phone 101 can use (S104). When the destination IP phone 102 has a 050-prefixed IP phone number assigned by the same telecommunications provider as the source IP phone 101, there is a possibility that phone charges are free. Even when the destination IP phone 102 has a 050-prefixed IP phone number assigned by a telecommunications provider different from the one for the source IP phone 101, there is a possibility in general that phone charges are lower than those for calls made via a PSTN. Therefore, when the destination IP phone 102 stores a 050-prefixed IP phone number, the process proceeds to step S107 where the source IP phone 101 specifies, as its dialing information, "05012345678", the 050-prefixed IP phone number of the destination IP phone 102 (S107). The source IP phone 101 then transmits a call to "05012345678", the IP phone number of the destination IP phone 102 as its call destination (S108).

Furthermore, when the NAPTR record of the destination IP phone 102 includes no URI that uses the same independent communication network and no 050-prefixed IP phone number, the process proceeds to step S105 where the source IP phone 101 specifies, as its dialing information, "0455445XXX", the regular telephone number (PSTN) of the destination IP phone 102 (S105), which is input in S100. The source IP phone 101 then transmits a call to "0455445065", the regular telephone number of the destination IP phone 102 as its call destination (S108).

When a call is transmitted based upon the dialing information that is specified in step S106, IP phone 101 inquires DNS server 104 of an IP address that corresponds to URI "sip:info@sip.aaaa.com". IP phone 101 then establishes a connection with the IP address of the destination IP phone 102, the IP address being sent from DNS server 104 or transmits, to a SIP server owned by a provider that provides an independent network, an INVITE request that specifies, as its call destination, "sip:info@sip.aaaa.com", the URI of the destination IP phone 102. This initiates signaling via the SIP server.

When a call is transmitted based upon the dialing information that is specified in step S107, an INVITE request is transmitted to the VoIP network provided by the subscribing telecommunications provider, specifying the IP telephone number "05012345678" as its call destination. This initiates signaling via the VoIP network by the telecommunications provider.

When a call is transmitted based upon the dialing information that is specified in step S105, a call control starts for the switch board for PSTN 107, specifying the regular telephone number "0455445XXX" as its call destination.

In the above description, instead of having the source IP phone 101 obtain the NAPTR record of the destination IP phone 102 and then transmit a call to the top most row of the NAPTR record (the highest priority URI) of the destination IP phone 102, a specific number that may use the lowest call rate is selected after determining communication services that are available to both source and destination IP telephones by referring to the search table of the source IP telephone. As a result, users can keep the communication cost down without individually acknowledging each other's communication service. It is further possible for users, if they wish, to rewrite the search order in the search table.

In addition, since a search occurs in the ascending order of call rates from the lowest, the specific number that is first retrieved as a result of the search is specified as the destination specific number that costs the least. The search can be concluded at that point, thereby making it possible to initiate a call transmission quickly while avoiding unnecessary processes.

In the above description, an example is provided wherein a search occurs in the search table for an independent communication network (1), a VoIP network based upon the 050 number system (1), and PSTN (1), in that order. However, the present invention is not limited to such an arrangement. The ascending order of call rates varies depending on specific combinations of communication services respectively available to the caller and call destination. Therefore, when a communication service that is different from the current one is introduced, the search order may vary according to the communication service. Although the order indicated in the search table of FIG. 6 well reflects the current price system, it only serves as an example.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-292864 filed on Oct. 5, 2004, entire content of which is expressly incorporated by reference herein.

What is claimed is:

1. An IP telephone apparatus comprising:
   a dialing unit that is used to input a telephone number of a call destination;
   a data obtainer that obtains, from an ENUM (Telephone Number Mapping) server, a NAPTR (Naming Authority Pointer) record of the call destination based on the input telephone number of the call destination, the NAPTR record comprising a list including at least one communication service available to the call destination, respectively associated with at least one specific number;
   a table that stores at least one communication service available to the IP telephone apparatus, arranged in ascending order of call rates, from a lowest call rate to a highest call rate;
   a retrieval unit that determines a lowest call rate communication service available to both the IP telephone apparatus and the call destination by sequentially searching the list of at least one communication service available to the call destination in the obtained NAPTR record, for each of the at least one communication service stored in the table, in ascending order of call rates, from the lowest call rate, and retrieves from the obtained NAPTR record, an available specific number that is associated with the determined lowest call rate communication service; and
   a transmitter that transmits a call to the call destination by using the retrieved available specific number,
   wherein the retrieval unit sequentially selects one of the at least one communication service available to the IP telephone apparatus stored in the table in ascending order of call rates from the lowest call rate, and determines whether the selected communication service is included in the list of at least one communication service available to the call destination in the obtained NAPTR record, and, upon determining that the selected communication service is included in the list of at least one communication service available to the call destination in the obtained NAPTR record, determines that the selected communication service is the lowest call rate communication service available to both the IP telephone apparatus and the call destination.

2. The IP telephone apparatus according to claim 1, wherein, when said retrieval unit retrieves a first specific number, said transmitter starts a transmission process by using the first retrieved specific number.

3. The IP telephone apparatus according to claim 1, wherein the at least one communication service available to the IP telephone apparatus stored in the table includes a communication service using an independent communication network, a communication network using a 050 number system and a communication service using a PSTN, and
   said retrieval unit retrieves the available specific number associated with the at least one communication service included in the obtained NAPTR record matching the communication service using the independent communication network, the communication network using the 050 number system and the communication service using the PSTN in this order.

4. A communication service selection method performed by a source IP telephone apparatus, comprising:
   storing, in advance, in the source IP telephone apparatus, a table that includes at least one communication service available to the source IP telephone apparatus, arranged in ascending order of call rates, from a lowest call rate to a highest call rate;

inputting a telephone number of a call destination;

obtaining, from an ENUM (Telephone Number Mapping) server, a NAPTR (Naming Authority Pointer) record of the call destination based on the input telephone number of the call destination, the NAPTR record comprising a list including at least one communication service available to the call destination respectively associated with at least one specific number;

determining a lowest-cost communication service available to both the IP telephone apparatus and the call destination by sequentially searching the list of at least one communication service available to the call destination in the obtained NAPTR record, for each of the at least one communication service stored in the table, in ascending order of call rates, from the lowest call rate;

retrieving, from the obtained NAPTR record, an available specific number that is associated with the determined lowest-cost communication service; and transmitting a call to the call destination by using the retrieved available specific number;

wherein the determining comprises:

sequentially selecting one of the communication services available to the IP telephone apparatus stored in the table in ascending order of call rates from the lowest call rate, determining whether the selected communication service is included in the list of at least one communication service available to the call destination in the obtained NAPTR record, and, upon determining that the selected communication service is included in the list of at least one communication service available to the call destination in the obtained NAPTR record, determining the selected communication service as the lowest call rate communication service available to both the IP telephone apparatus and the call destination.

5. The IP telephone apparatus according to claim 1, wherein the table stores a plurality of communication services available to the IP telephone apparatus in ascending order of call rates, from the lowest call rate to the highest call rate.

6. The communication service selection method according to claim 4, wherein the storing stores, in the table, a plurality of communication services available to the IP telephone apparatus in ascending order of call rates, from the lowest call rate to the highest call rate.

* * * * *